(12) United States Patent
Squire et al.

(10) Patent No.: US 6,800,310 B2
(45) Date of Patent: Oct. 5, 2004

(54) CEREAL AGGLOMERATION PROCESS AND AGGLOMERATED CEREAL PRODUCT

(75) Inventors: George M. Squire, Battle Creek, MI (US); Dale W. Cox, Battle Creek, MI (US); Elizabeth L. Walker, Battle Creek, MI (US); William P. Citarella, Portage, MI (US); Christopher Kallgren, Battle Creek, MI (US)

(73) Assignee: Kraft Foods Holdings, Inc., Northfield, IL (US)

( * ) Notice: Subject to any disclaimer, the term of this patent is extended or adjusted under 35 U.S.C. 154(b) by 258 days.

(21) Appl. No.: 10/215,672

(22) Filed: Aug. 9, 2002

(65) Prior Publication Data

US 2004/0028797 A1 Feb. 12, 2004

(51) Int. Cl.[7] .................. A23L 1/164; A23L 1/0532; A23L 1/0534
(52) U.S. Cl. ............... 426/96; 426/99; 426/103; 426/453; 426/465; 426/512; 426/519; 426/620; 426/640
(58) Field of Search ................... 426/96, 99, 103, 426/453, 465, 512, 519, 620, 640

(56) References Cited

U.S. PATENT DOCUMENTS

| | | | |
|---|---|---|---|
| 3,840,685 A | 10/1974 | Lyall et al. | 426/618 |
| 4,038,427 A | 7/1977 | Martin | 426/285 |
| 5,413,805 A | 5/1995 | Delpierre, III et al. | 426/620 |

FOREIGN PATENT DOCUMENTS

| WO | WO 02/21937 | 3/2002 | A23L/1/164 |
|---|---|---|---|

*Primary Examiner*—Helen Pratt
(74) *Attorney, Agent, or Firm*—Thaddius J. Carvis; Thomas A. Marcoux

(57) ABSTRACT

An improved, low-fat cereal product contains clusters of base cereal comprising crisp, friable cereal preferably principally or all crisp cereal comprised of crisp rice, flaked cereal and/or puffed cereal. The clusters are prepared by binding together a plurality of crisp cereal pieces by applying in sequence, liquid oil, dry binder mix and a liquid sugar mixture.

19 Claims, 1 Drawing Sheet

CEREAL AGGLOMERATION PROCESS AND AGGLOMERATED CEREAL PRODUCT

BACKGROUND OF THE INVENTION

The invention relates to an improved cereal agglomeration process and a crisp agglomerated cereal product, especially one having a low fat content and based on a delicate, friable base cereal.

Some coating solutions containing sugar, fat or hydrocolloids, have been applied to a variety of food products—for a variety of reasons. In some cases, prior art products required a sugar coating, either glossy or frosted for sweetness. Some products required flexibility in a bar-type product. And, some were applied for the purpose of achieving agglomeration. Many different purposes and many different compositions have been disclosed. Some agglomerated products rely on significant oil contents to minimize sticking to the equipment during processing and maintain flexibility while warm to facilitate proper sizing without creating undue amounts of fines. It would, however, be desirable to reduce the presence of fat to minimal levels, without eliminating the known benefits of oil at significant levels.

The art has been in need of low-fat, agglomerated (or clustered) ready-to-eat cereal products and has endeavored to make one with a desirable crispness to the bite and tender chew while not sacrificing bowl life in the presence of milk or creating issues such as equipment fouling. It would be especially desirable to have such a cereal product that maintained the visual identity of the base cereal components yet would be crunchy initially and for extended periods in contact with milk.

Consumers interested in assuring themselves a healthy diet have increasingly sought out low-fat products and prefer those having a natural appearance or taste. However, the preparation of low-fat, natural-appearing cereals presents a number of challenges in terms of taste, texture and processing. And, when it is desired to produce a cereal comprised of initially crisp, friable and/or fragile components, the problems are increased.

In one example of agglomerated cereals, U.S. Pat. No. 4,038,427 to Martin, describes a natural granola product known as C. W. Post brand granola cereal prepared by agglomerating a granola-like mix. An assortment of amylaceous and proteinaceous particles is agglomerated around pieces of puffed, cupped, toasted cereal (such as crisp rice) which serve as focal points for adhering the other ingredient particles. Oil and sugar coatings were applied, the oil at levels sufficient to give a total fat content of at least about 15% by weight. Thus, the disclosure did not provide teachings as to the preparation of a low-fat cereal product, much less one having the desired characteristics of the type provided by the invention. The use of a fragile cereal like crisp rice was principally to provide an acceptable nucleus for agglomerating the other diverse ingredients and was used at relatively low levels.

In U.S. Pat. No. 5,413,805 to Delpierre, III, et al., a low-fat granola cereal is prepared by combining, e.g., 30% to 50% cereal flakes, 10% to 40% other cereal ingredients including 5% to 20% crisp rice, and up to 20% cereal flour. Optionally, from 1% to 5% maltodextrin can be added to tackify the product. In the process, the dry ingredients including the cereal and maltodextrin are added to a coating reel and the optional oil can then be added. Then, coating syrup is applied. The disclosure prefers the use of 5% to 9% oil.

The prior art is replete with references to techniques for applying sugar coatings to cereal products to enhance palatability and, sometimes, texture. In some early patents, fat and sugar coatings were both applied. In others, only sugar was employed. In U.S. Pat. No. 3,840,685, Lyall, et al., disclose the use of an emulsified oil and sugar coating to enable a one-step application of a sugar coating to a cereal product and eliminate the separate coating of oil. Again, however, the disclosure is silent with regard to the problems associated with the preparation of an agglomerated cereal product with a low fat content, yet exhibiting extended crispness retention. Recently, in WO 02/21937, Green, et al., describe a crispy savory snack food comprising a cereal which is agglomerated by a binder comprising a sugar. The binder is said to contribute to crispness or crunchiness. The binder can contain optional low amounts of oil or starch in addition to the sugar component. The binder mixture is prepared in a first step in the process by simply mixing and heating the ingredients, principally sugar and water. The binder mixture is then applied to a cereal component by mixing. The cereal and binder mixture is then lightly compressed and dried.

There remains a need for an improved cereal agglomeration process and an agglomerated cereal product, especially one having a low fat content and exhibiting extended crispness retention for delicate, friable base cereals.

BRIEF DESCRIPTION OF THE DRAWING

The invention will be better understood and its advantages more apparent from the following description, especially when read in light of the accompanying drawing, wherein.

SUMMARY OF THE INVENTION

Figure 1:
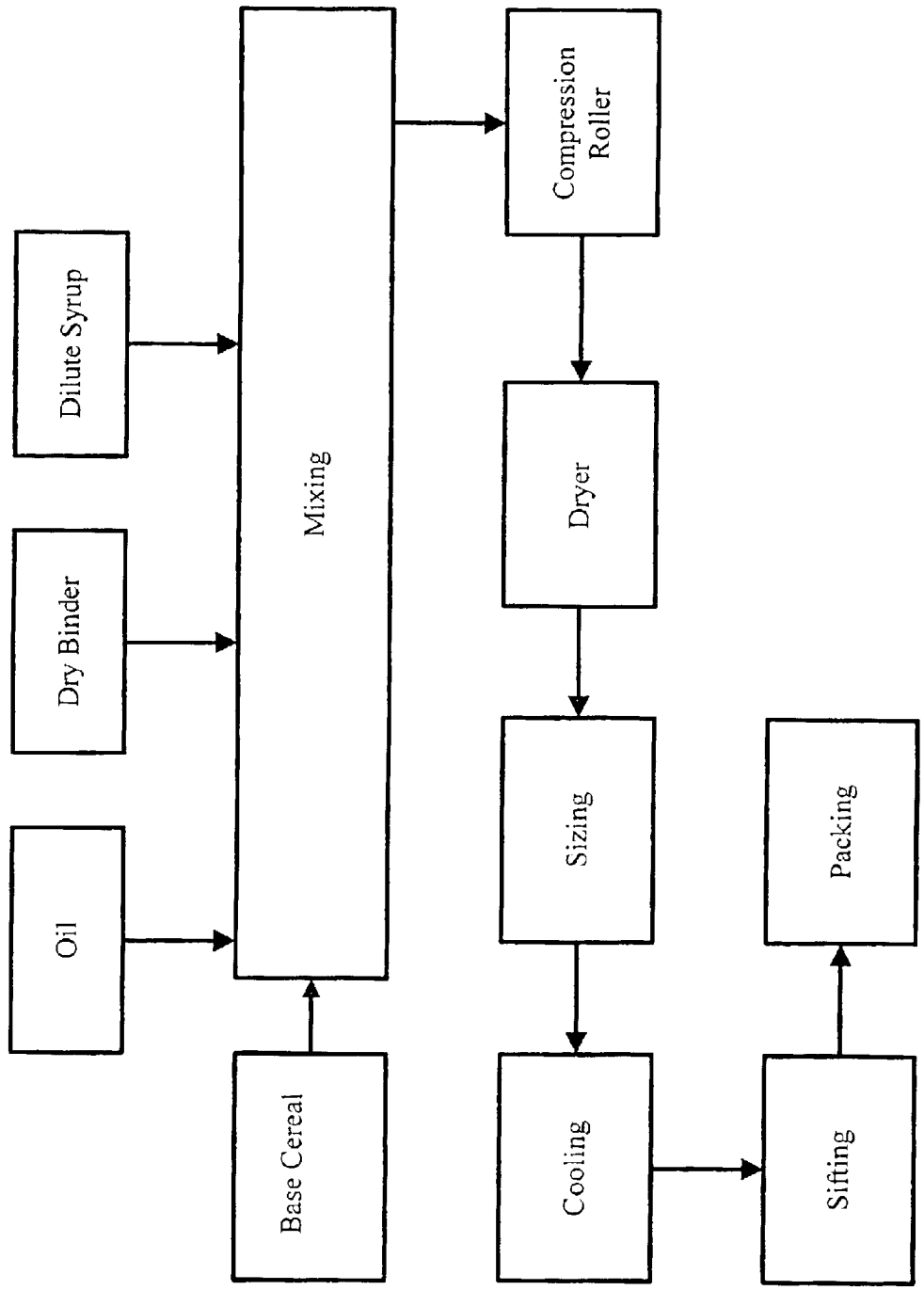
FIG. 1 is a block diagram illustrating a process sequence according to the invention.

It is an object of the invention to provide an improved agglomerated cereal product of the ready-to-eat variety, especially one having a crisp texture and a low fat content.

It is another object of the invention to provide an improved method for preparing a low-fat, agglomerated, ready-to-eat cereal product which is crisp initially and maintains crispness after application of milk for serving.

It is another object of the invention to provide an improved low-fat, agglomerated cereal product of the ready-to-eat variety comprised of delicate, a friable base cereal as a major component, in an amount sufficient with an applied coating to provide a distinctly crispy product.

It is yet another objective of the invention to provide a process for preparing an agglomerated cereal product that has a low fat content yet minimizes buildup of residue on susceptible processing equipment.

It is yet another objective of the invention to provide a process for preparing an agglomerated cereal product that has a low fat content yet maintains the product sufficiently pliable for periods of time sufficient to facilitate sizing.

It is yet another objective of the invention to provide a low-fat, agglomerated cereal product that is crisp initially and has an extended bowl life when served with milk, yet can be prepared with a minimal production of fines which would otherwise need to be removed or detract from perceived product quality.

It is a more specific objective of a preferred aspect of the invention to provide a low-fat, agglomerated cereal product comprised principally of a crisp, friable base cereal that retains the visual identity of the base cereal and has an extended bowl life when served with milk, preferably 5 to 10 minutes or more.

These and other objects are accomplished by the invention, which provides a process for preparing an agglomerated cereal product, comprising: feeding a base cereal, preferably comprising a friable cereal, such as a crisp cereal comprised of crisp rice, flaked cereal and/or puffed cereal into a coating reel; adding to the base cereal, in sequence, binder ingredients comprising liquid oil, dry binder mix and a liquid sugar mixture, continuously mixing the cereal and added binder ingredients for sufficient times to uniformly distribute each of the binder ingredients on the cereal prior to application of the next; upon achieving a uniform distribution of binder ingredients on the base cereal, compressing the resulting binder-coated base cereal into a layer for drying; drying the resulting layer of binder-coated base cereal; and breaking up the binder-coated base cereal into clusters.

The invention also provides an improved, low-fat cereal product, comprising: clusters of cereal, preferably comprising rice wherein each cluster contains a plurality pieces of a cereal bound together by an adhesive coating prepared by applying in sequence, liquid oil, dry binder mix and a liquid sugar mixture.

The process and the cereal product produced by it have a number of preferred aspects, which are described below and shown in the attached drawing.

DETAILED DESCRIPTION OF THE INVENTION

This description will enable a process for preparing an improved low-fat, agglomerated, ready-to-eat cereal product, preferably comprised of crisp, friable cereal. It is, however, an advantage of the invention that a variety of base cereal components can be successfully employed to produce ready-to-eat cereal products which are crisp initially and after application of milk. Preferably, the cereal will contain a major component, e.g., greater than 50% by weight of the base cereal, of friable cereal, such as crisp cereal comprised of crisp rice, flaked cereal and/or puffed cereal. The invention enables the use of crisp, friable cereal as a principal, major or sole cereal ingredient while still achieving the noted benefits. Without the process of the invention, it has not been possible to achieve a product having the characteristics exhibited by products described herein. That this product can be achieved in such a simple manner and utilizing conventional equipment is surprising.

The products of the invention will have low added fat and total fat contents, preferably less than the products of Martin in U.S. Pat. No. 4,038,427, cited above. It is surprising that the products of the invention have a pleasing mouthfeel at low fat contents. In addition, the process of the invention minimizes residue from building up in stainless steel processing equipment when using sticky ingredients like sugar syrups, even in the absence of significant oil contents. Another advantage of the invention is that the cereal product can be efficiently sized to a durable cluster size, and preferably desirable bulk density, without the production of large amounts of fines. The terms fat and oil will be used interchangeably herein, the person of ordinary skill in the art recognizing that the terms both refer to triglycerides. When a distinction is intended for illustrative purposes herein, the term "liquid oil" will be used to identify triglycerides that are liquid, i.e., pourable, at 25° C. Crisp, friable cereals produce an audible crunch when chewed. The preferred products will contain less than 1 gram of total fat per serving, e.g., about 50 grams. Serving sizes will vary and it is often desirable to provide a product which the meets regulatory definition of low-fat for a particular type of product.

FIG. 1 is a block diagram illustrating a process sequence according to the invention. The use of this process sequence enables binder activation to provide sufficient tackiness for agglomeration without being so sticky as to excessively coat processing equipment and is not deteriorative of base cereal texture. As the initial stages of processing, premixed batches are prepared for both a dry binder mixture and a syrup mixture for applying to a base cereal component, following application of a small amount of oil to the base cereal. These ingredients in sequential application impart a unique combination of properties to the products of the invention. It is an advantage of the invention that an agglomerated or clustered cereal product can be prepared that exhibits a low fat content and crisp and crunchy initial bite, which continues as the product is chewed. This property is accompanied by an excellent resistance to sogginess due to hydration by milk when prepared for serving. That this type of product can be obtained in a process that minimizes fouling of stainless steel processing equipment dealing with a normally sticky mixture and achieves products having the desired bulk density and product appearance is even more surprising.

In a preferred form, the process will entail adding to a base cereal component, in sequence and based on the weight of the base cereal component, binder ingredients comprising from 1 to 3% fat, from 2% to 8% dry binder mix and 10% to 45% of sugar solids in a liquid sugar mixture (these percentages being based on the final, dry product weight). More preferred ranges will be 1 to 2% fat, 3 to 6% dry binder and 25 to 40% sugar solids. The additions are made while continuously mixing the cereal with each of the sequentially added binder ingredients for sufficient times to uniformly distribute each of the binder ingredients on the cereal prior to application of the next. The resulting coated cereal is then compressed, dried, sized, cooled and packaged, preferably as described below.

The products of the invention are intended to be crisp to the bite, and the process of the invention assures that this property is maintained even after application of milk for serving. Thus, the products of the invention have extended bowl life in terms of crispness. The process itself assures a crisp character, but it is advantageous to use base cereal components which have a high degree of crispness prior to processing. Prominent among these components are the various puffed, flaked, shredded and otherwise shaped and crispened forms of corn, rice, wheat, oats and the like. In its preferred forms, the base cereal component of the cereal product of the invention will be comprised of rice, e.g., as a major or principal ingredient. To provide a desirable crispness, one or more of these crisp base cereal components can comprise at least about 50% of the base cereal. Preferred products of the invention can contain at least 50% by weight, and preferably at least 75% by weight of crisp rice, based on the weight of the base cereal component.

By the term "base cereal component" is meant all of the grain-based materials employed in the agglomerated product. It is an advantage of the invention that the visual appearance of pleasing cereal shapes, like that of crisp rice, can be retained in the final cereal products. It is an advantage that the invention provides durability to crisp, friable cereal components. Preferred products can contain at least 85% to as much as 100% by weight crisp rice based on the weight of the base cereal component. In a particularly desirable ready-to-eat cereal product of the invention, crisp rice will comprise essentially the entire base cereal component. The use of crisp rice, when processed according to the invention, provides excellent texture and agglomeration properties. The rice surprisingly retains its crisp texture without toughening and forms into crunchy clusters or agglomerates.

The process used to produce the crisp rice component is not a critical aspect of the invention, but the crisp rice will preferably exhibit, by itself, a bulk density of from about 100 to about 170 grams/liter. Typically, milled rice will be pressure cooked with a flavoring syrup whereupon the rice will be dried to a moisture content, say, on the order of 15% to 20% and then tempered for a prolonged period (e.g., 16 hours), whence it will be charged to a pre-heated oven to plasticize and warm it to a relatively high temperature to condition the rice for bumping. The rice will be bumped, but not flaked, to the point of producing a flattened, non-resilient rice mass. It will be flattened to less than that condition wherein it loses its integrity as a grain per se. The bumping causes the rice to assume a thickness dimension generally from 0.01 to 0.03 inches. After bumping, the rice will be charged to a puffing oven where it will be blasted with heated air (380° F. to 550° F.) at atmospheric conditions for a period of, say, 12 to 15 seconds to produce the characteristic puffed crisp rice.

As noted, the base cereal portion can preferably contain a major amount of crisp rice, but can include other cereal solids such as cereal flakes, rolled grains, e.g., rolled oat groats, bumped rolled wheat or bumped rolled barley, extruded and puffed particles made from grain flours and other grain-based cereal components such as flours, wheat germ, rye, corn, milo, sorghum, buckwheat meals and/or flours, high protein classified wheat flour fractions, and the like.

The crisp rice, cereal flakes and/or other cereal ingredients can be supplemented with conventionally employed dry fruits and edible nuts and milk derivatives. For example, dried fruit such as coconut, raisins and apricots may be employed. Edible nuts such as almonds, walnuts and other consumer preferred nuts may be used. These other materials, such as fruits and nuts are not included within the term "base cereal component" if added after the binder materials and would require redetermination of preferred binder amounts if added before. Ration-balancing cereal protein or protein from other sources, e.g., soy bean curd, and milk derivatives such as whey or whey protein concentrates, and mixtures of these ingredients, can also be added.

The base cereal component, e.g., crisp rice, preferably has a suitable vitamin premix applied thereto. This will be done, if desired, either before or after the base cereal component is metered into a batch or continuous mixer. The mixer is run at a suitable mixer rate to achieve uniform distribution of the base cereal component with the other components of the product which are applied in the mixer. Suitable mixers are known to the art and are exemplified by a coating reel. Similarly, a flavor or flavor mixture can be added at a suitable stage in a suitable form, with only minor adjustment of the amounts of liquid and dry binder components described below.

As shown in FIG. 1, the base cereal component is sprayed with a suitable fat or oil, preferably a liquid oil of vegetable origin, while the base cereal component is tumbling in the mixer. Any of the fats and oils usually employed for this purpose and having suitable flavor and aroma can be employed. Among these are safflower oil, sunflower oil, high oleic sunflower, corn oil, rice bran, soybean oil, sesame, peanut, olive, babassu nut, palm, cottonseed, low erucic rapeseed, and the like oils, with the more highly unsaturated oils being particularly preferred. While not preferred, animal fats such as tallow, lard, and dairy butter and the like may be employed. An antioxidant can be employed along with the oil or can be added following coating the based cereal with oil, as may be desired.

In their preferred forms, the agglomerated cereal products of the invention comprise 50% to 85% base cereal, and 15% to 50% of a binder system comprising up to about 5% fat (based on the weight of the final product) added to the cereal before addition of dry, then wet binder components, which are applied in stages. Importantly, the dry binder mixture is applied to the base cereal after the oil is applied but before applying a liquid binder syrup. Desirably, the weight ratio of solids in the dry binder mixture to that in the liquid binder syrup will be within the range of from about 1:2 to about 1:10, e.g., from 1:3 to 1:6. Also desirably, the amount of solids in the combination of dry and liquid binders will be from about 30% to about 45%, preferably from 35% to 40%, by weight of total blend of all components including base cereal, fat and binder.

The dry binder mixture will contain at least one pregelatinized starch, preferably a mixture of chemically-modified and non chemically-modified pregelatinized starches, and preferably at least one hydrocolloid gum, e.g., a seaweed extract gelling agent, preferably comprising carrageenan. The use of a gum such as carageenan is especially useful when using stainless steel or like equipment. Tests indicated that the gum surprisingly reduces fouling on this type of equipment.

In its preferred form, the dry binder mixture is prepared by blending a pregelatinized starch component, preferably containing both an unmodified (nonchemically modified) pregelatinized starch component and a chemically-modified, e.g., cross-linked, starch component and a hydrocolloid gum, preferably comprising at least one seaweed extract gelling agent, preferably comprising carrageenan. The term "chemically modified starch" is readily understood by those skilled in the art and is described in 21 C.F.R. §§ 172, 892. The examples which follow illustrates starches of both types. The weight ratio of chemically modified to unmodified starches in preferred forms of the invention will range from about 1:20 to 1:5, e.g., about 1:10.

Edible hydrocolloid gums which may be employed as a dry binder component include the hydrocolloid gums carrageenan, alginate gum, guar gum, locust bean gum, xanthan gum, gum arabic, gum tragacanth, and combinations thereof. Seaweed extract gelling agents like carrageenan and alginate gum are preferred. Carrageenan, i.e., a complex mixture of sulfated polysaccharides extracted from red seaweed, such as kappa and iota carrageenan, among the group of seaweed extracts, is preferred. The ratio of gum to starch will preferably be within the range of from about 1:30 to about 1:10, e.g., about 1:20 to about 1:25. The use of a gum such as carageenan is especially useful when using stainless steel or like equipment which tests have indicated is subject to fouling if not employed. This is an important and surprising feature of the invention.

The work underlying the invention has been conducted principally on cornstarch, but there is no reason known to exclude starches from any particular source. Those skilled in the art know that starch is deposited in various plants in the form of minute cold water insoluble granules. The sources of starches include seeds of plants such as wheat, sorghum and rice, tubers such as potato (including those derived from white potatoes, yams and sweet potatoes, among others), cassava and arrowroot and the pith of plants such as the sago palm and other sources including tapioca and the like.

After preparing a dry binder blend, for example in a V-blender, the resulting dry binder blend is metered into the mixer containing the oil-coated base cereal component and allowed to mix with the base cereal, e.g., crisp rice, for about 15–30 seconds again while the mixer is running to achieve uniform distribution.

Next, the syrup mixture is metered into the mixer and onto the already applied oil and dry mixture coated crisp rice, the syrup being applied at a temperature of about 160° to 170° F., with mixing continued for about 60 to 90 seconds to achieve uniform coating. The liquid binder syrup will comprise sucrose, preferably added as a syrup and liquid corn syrup, preferably high fructose corn syrup. Among the various sugars are those including glucose, maltose, fructose, sucrose and other mono-, di- and tri- and oligosaccharide materials present in corn and other sugar syrups. The liquid syrup will typically have a solids content of from about 55% to about 80% by weight of the syrup.

The resulting coated crisp rice is then deposited onto a dryer belt and compressed to a thickness of about 1 to 2 inches to maximize surface contact between the coated rice particles. The compressed mixture is then dried at a suitable temperature, e.g., from about 250° F. to about 300° F., such as with forced convection to a suitable moisture content, e.g., of from about 1.5 to about 3.5%, taking about 4 to 7 minutes. Upon exiting the dryer, the mixture is broken up such as with pin breakers to obtain clusters or agglomerates. Agglomerate or cluster size can be an important parameter in terms of spoonability and mouthfeel. Typical cluster sizes will be in the range of from about 10 to 40 mm in major dimension and from about 1 to about 10 mm in minor dimension, preferably of from about 19 to 32 mm in major dimension and from about 2 to about 6 mm in minor dimension. Other sizing equipment, such as rakes, forks and/or plows can also be employed to achieve the desired sizing as is known in the art.

Following sizing and cooling the product is packaged in sealed plastic bags with outer paperboard boxes.

Bulk density can also be an important parameter both in terms of the ability to uniformly fill a box with the appropriate net weight and with the appearance that it is full. It also affects the amount in a spoonful—giving the consumer the expected volume to chew without providing either too much or too little to chew. The process of the invention enables very good control of product bulk density, typically being within the range of from 0.15 to 0.25 grams per cm$^3$, preferably from about 0.17 to 0.21 grams per cm$^3$. The bulk density of the cereal can vary considerably depending on the base cereal components employed and the amount of binder material employed will generally increase as the bulk density decreases. The amounts indicated above and in the examples below provide a guide based on the bulk densities exemplified.

Bite is defined as crisp when it yields an audible crunch when chewed. The cereal produced by the invention, unlike many agglomerated cereals, maintains its crisp texture for time periods of more than 5 minutes, preferably greater than 10 minutes, and most preferably greater than 12 to 15 or more, minutes, in a bowl after pouring in milk. The term friable is given objectivity by expert panel tasters using a ten point scale, with optimally-crisp, crisp rice cereal as a 10 and fully milk softened crisp rice as a 1. Preferred levels of friability, e.g., for crisp rice, flaked cereals and puffed cereals will be at least 8 and preferably 9 or better, e.g., at least 9.5. The degree of crispness retention achieved by following the invention is surprising.

The following Examples are provided to further illustrate and explain a preferred form of the invention and are not to be taken as limiting in any regard. Unless otherwise indicated, all parts and percentages are by weight.

EXAMPLE 1

This example presents one preferred process and formulation for preparing an agglomerated rice cereal product of the invention.

As an initial stage in the process, a series of premixes is prepared including the ingredients shown in the tables below:

Dry Binder Batch

| Ingredient | Weight, Pounds | Percent of Batch |
|---|---|---|
| Pregelatinized Corn Starch, Staley Mira Gel 463 | 61.4 | 85.5 |
| Modified Pregelatinized Starch, Grain Processing B792 | 7.4 | 10.3 |
| Carrageenan, FMC GP379 | 3.1 | 4.2 |
| Totals | 71.9 | 100.0 |

Liquid Syrup Batch

| Ingredient | Weight, Pounds | Percent of Batch |
|---|---|---|
| Liquid Sucrose, 67.5 Brix | 500.0 | 84.40 |
| Water | 62.3 | 10.51 |
| High Fructose Corn Syrup | 25.2 | 4.25 |
| Natural Flavor Solution | 5 | 0.84 |
| (Approximately 15% solids) Totals | 592.5 | 100 |

The mixtures prepared by blending the above dry binder batch and coating syrup batch are then applied in accord with following procedure in relative amounts shown in the following table:

Batching

| Ingredient | Order of Addition | Weight, Pounds | Percent of Batch Wet | Percent of Batch Dry |
|---|---|---|---|---|
| Crisp Rice, Vitamin Fortified | 1 | 1000.0 | 59.5 | 68.58 |
| Vegetable Oil, safflower | 2 | 20.0 | 1.19 | 1.41 |
| Dry Binder Mixture | 3 | 73.1 | 4.35 | 4.76 |
| Liquid Syrup Mixture | 4 | 587.5 | 34.96 | 25.25 |
| Totals | | 1680.6 | 100 | 100 |

The crisp rice (having a suitable vitamin premix applied thereto, if desired) is metered into a batch mixer and sprayed with the safflower oil while the mixer is running at a suitable mixer rate to achieve uniform distribution of the oil on the crisp rice. Then, the dry binder mixture, prepared as above is metered into the mixer and allowed to mix with the crisp rice for about 15–30 seconds again while the mixer is running to achieve uniform distribution. Next, the dilute syrup mixture is metered into the mixer and onto the already liquid oil and dry mixture coated crisp rice, the syrup being applied at a temperature of about 160° to 170° F., with mixing continued for about 60 to 90 seconds to achieve uniform coating. The resulting coated crisp rice is then deposited onto a dryer belt and compressed to a thickness of about 1 to 2 inches to maximize surface contact between the coated rice particles. The compressed mixture is then dried at 250° F. with forced convection to a moisture content of from about 1.5 to about 3.5%, taking about 4 to 7 minutes. Upon exiting the dryer, the mixture is broken up with pin breakers and is sieved to achieve crisp rice clusters with an agglomerate size range of from about 19.1 to 31.8 mm in major dimension and from about 2.4 to about 5.6 mm in minor dimension. Following sizing and cooling the product is packaged in sealed plastic bags with outer paperboard boxes.

A test was run to demonstrate the hydration resistance of the product. A 55 gram sample of the product was placed in three ceramic bowls, and one cup of milk was poured over the cereal. Potions of each were consumed every minute for 15 minutes. At the end of the test, the crisp rice clusters were still found to be crisp.

EXAMPLE 2

This example presents one preferred process and formulation for preparing an agglomerated cereal product of the invention, comprised of a corn flake base cereal component.

The formulation as follows was processed in essentially the manner of Example 1, but due to the increase in the relative surface area of this type of cereal as compared to crisp rice, the ratio of dry binder to cereal base and liquid syrup had to be adjusted to achieve the desired agglomeration.

Dry Binder Batch

| Ingredient | Weight, Pounds | Percent of Batch |
|---|---|---|
| Pregelatinized Corn Starch, Staley Mira Gel 463 | 61.4 | 85.5 |
| Modified Pregelatinized Starch, Grain Processing B792 | 7.4 | 10.3 |
| Carrageenan, FMC GP379 | 3.1 | 4.2 |
| Totals | 71.9 | 100 |

Liquid Syrup Batch

| Ingredient | Weight, Pounds | Percent of Batch |
|---|---|---|
| Liquid Sucrose, 67.5 Brix | 500 | 84.40 |
| Water | 62.3 | 10.51 |
| High Fructose Corn Syrup | 25.2 | 4.25 |
| Natural Flavor | 5 | 0.84 |
| (About 15% solids) Totals | 592.5 | 100 |

Batching

| Ingredient | Order of Addition | Weight, Pounds | Percent of Batch Wet | Percent of Batch Dry |
|---|---|---|---|---|
| Crisp Rice, Vitamin Fortified | 1 | 750 | 52.43 | 62.08 |
| Vegetable Oil, safflower | 2 | 20.0 | 1.40 | 1.71 |
| Dry Binder Mixture | 3 | 73.1 | 5.11 | 5.74 |
| Liquid Syrup Mixture | 4 | 587.5 | 41.06 | 30.47 |
| Totals | | 1430.6 | 100 | 100 |

The above description is intended to enable the person skilled in the art to practice the invention. It is not intended to detail all of the possible modifications and variations which will become apparent to the skilled worker upon reading the description. It is intended, however, that all such modifications and variations be included within the scope of the invention which is seen in the above description and otherwise defined by the following claims. The claims are meant to cover the indicated elements and steps in any arrangement or sequence which is effective to meet the objectives intended for the invention, unless the context specifically indicates the contrary.

What is claimed is:

1. A process for preparing an agglomerated cereal product, comprising:
   feeding a base cereal comprising a crisp, friable cereal into a coating reel;
   adding to the base cereal, in sequence, binder ingredients comprising liquid oil, dry binder mix and a liquid sugar syrup, continuously mixing the base cereal and added binder ingredients for sufficient times to uniformly distribute each of the binder ingredients on the base cereal prior to application of the next binder ingredient;
   upon achieving a uniform distribution of binder ingredients on the base cereal, compressing the resulting binder-coated base cereal into a layer for drying;
   drying the resulting layer of binder-coated base cereal; and
   breaking up the binder-coated base cereal into clusters.

2. A process according to claim 1, wherein the liquid sugar syrup comprises sucrose and corn syrup and has a solids content of from about 55% to about 80% by weight of the syrup.

3. A process according to claim 1, wherein the corn syrup comprises high fructose corn syrup.

4. A process according to claim 3, wherein the dry binder mix comprises a pregelatinized starch component and a hydrocolloid gum.

5. A process according to claim 4, wherein the pregelatinized starch component comprises an unmodified pregelatinized starch component and a chemically-modified starch component.

6. A process according to claim 5, wherein dry binder mix comprises carrageenan and the weight ratio of chemically modified to unmodified starches is in the range of from about 1:20 to 1:5.

7. A process according to claim 6 wherein, based on the weight of the base cereal, the liquid oil is added in an amount of from 1 to 3%, the dry binder mix is added at a level of from 2% to 8% and the liquid sugar syrup is added in an amount sufficient to supply from 10% to 45% sugar solids based on the dry weight of the final product.

8. A process according to claim 7 wherein the base cereal component comprises at least 50% crisp, friable cereal comprised of crisp rice, cereal flakes or puffed cereal, and each of the clusters contains a plurality of crisp, friable cereal pieces.

9. A process according to claim 8 wherein the base cereal component comprises essentially all crisp rice.

10. A process for preparing an agglomerated cereal product, comprising:

feeding a base cereal comprising at least 50% crisp cereal into a coating reel;

adding to the cereal, in sequence and based on the weight of the cereal, binder ingredients comprising from 1 to 3% liquid oil, from 2% to 8% dry binder mix and liquid sugar syrup in an amount sufficient to supply from 10% to 45% sugar solids based on the dry weight of the final product;

continuously mixing the base cereal and each of the added binder ingredients for sufficient times to uniformly distribute each of the binder ingredients on the cereal prior to application of the next binder ingredient;

upon achieving a uniform distribution of binder ingredients on the base cereal, compressing the resulting binder-coated base cereal into a layer for drying;

drying the layer of binder-coated base cereal; and breaking up the binder-coated base cereal into clusters, each containing a plurality of crisp rice pieces.

11. A process according to claim 10, wherein the base cereal comprises at least 85% crisp rice, cereal flakes and/or puffed cereal.

12. A process according to claim 10, wherein the liquid sugar syrup comprises high fructose corn syrup.

13. A process according to claim 12, wherein the dry binder mix comprises a pregelatinized starch component and a hydrocolloid gum.

14. A process according to claim 13, wherein the pregelatinized starch component comprises an unmodified pregelatinized starch component and a chemically-modified starch component at a weight ratio of chemically modified to unmodified starches in the range of from about 1:20 to 1:5, and the hydrocolloid gum comprises carrageenan.

15. A process according to claim 14 wherein the base cereal component comprises at least 85% crisp rice.

16. A process according to claim 15 wherein the base cereal component comprises essentially all crisp rice.

17. A process for preparing an agglomerated cereal product, comprising:

feeding a base cereal comprising at least 50% crisp rice into a coating reel;

adding to the cereal, in sequence and based on the weight of the cereal, binder ingredients comprising
      from 1 to 3% liquid oil,
      from 2% to 8% dry binder mix comprising a pregelatinized starch component containing an unmodified pregelatinized starch component and a chemically-modified starch component, the weight ratio of chemically modified to unmodified starches being in the range of from about 1:20 to 1:5, and a hydrocolloid gum comprising carrageenan, and
      liquid sugar syrup in an amount sufficient to supply from 10% to 45%
    sugar solids based on the dry weight of the final product;

continuously mixing the cereal and added binder ingredients for sufficient times to uniformly distribute each of the binder ingredients on the cereal prior to application of the next;

upon achieving a uniform distribution of binder ingredients on the base cereal, compressing the resulting binder-coated base cereal into a layer for drying;

drying the layer of binder-coated base cereal; and breaking up the binder-coated base cereal into clusters, each containing a plurality of crisp nice pieces.

18. A process according to claim 17 wherein the base cereal component comprises at least 85% crisp cereal.

19. A process according to claim 18 wherein the base cereal component comprises essentially all crisp rice.

* * * * *